(12) United States Patent
Ross

(10) Patent No.: US 11,731,400 B2
(45) Date of Patent: Aug. 22, 2023

(54) MICROWAVE HEATABLE COMPOSITIONS AND ARTICLES MADE THEREFROM

(71) Applicant: David Ross, Ann Arbor, MI (US)

(72) Inventor: David Ross, Ann Arbor, MI (US)

(73) Assignee: David Samuel Ross, West Bloomfield, MI (US)

( * ) Notice: Subject to any disclaimer, the term of this patent is extended or adjusted under 35 U.S.C. 154(b) by 294 days.

(21) Appl. No.: 17/062,370

(22) Filed: Oct. 2, 2020

(65) Prior Publication Data

US 2021/0101371 A1  Apr. 8, 2021

Related U.S. Application Data

(60) Provisional application No. 62/911,823, filed on Oct. 7, 2019.

(51) Int. Cl.
*B32B 25/02* (2006.01)
*B32B 25/10* (2006.01)
*B32B 25/08* (2006.01)
*B32B 25/20* (2006.01)

(52) U.S. Cl.
CPC .............. *B32B 25/02* (2013.01); *B32B 25/08* (2013.01); *B32B 25/10* (2013.01); *B32B 25/20* (2013.01); *B32B 2264/1027* (2020.08); *B32B 2264/2032* (2020.08); *B32B 2307/302* (2013.01); *B32B 2437/00* (2013.01)

(58) Field of Classification Search
CPC ......... B32B 25/02; B32B 25/08; B32B 25/10; B32B 25/20; B32B 2264/1027; B32B 2264/2032; B32B 2307/302; B32B 2437/00; B32B 2264/10; B32B 2307/306; B32B 5/32; B32B 25/042; B32B 27/065; B32B 2266/0207; B32B 2437/02; B32B 5/02; B32B 5/18; B32B 5/245; B32B 7/12; B32B 25/045
See application file for complete search history.

(56) References Cited

U.S. PATENT DOCUMENTS

| | | | |
|---|---|---|---|
| 6,346,210 B1 * | 2/2002 | Swartz | A43D 1/022 264/487 |
| 2002/0050667 A1 * | 5/2002 | Swartz | B29C 44/5636 264/486 |
| 2006/0100680 A1 * | 5/2006 | Brikman | A47G 9/0223 607/96 |
| 2006/0124892 A1 * | 6/2006 | Rolland | B32B 15/085 252/70 |

(Continued)

*Primary Examiner* — Kevin R Kruer
(74) *Attorney, Agent, or Firm* — David Samuel Ross

(57) ABSTRACT

A microwave heatable composite material that comprises: a heat resistant moldable base material; a microwave heatable material dispersed in the heat resistant moldable base material; and a phase change material dispersed in the heat resistant moldable base material. The mixture of the microwave heatable material, heat resistant moldable base material, and phase change material provide a basic or core microwave heatable article layer to which one or more additional controlled heat releasing and/or heat transfer blocking layers can be combined to enhance and optimize heat therapy. In addition, the microwave heatable articles of the present invention can be used for cold therapy by lowering their temperatures in a freezer of similar cold environment.

3 Claims, 1 Drawing Sheet

(56) References Cited

U.S. PATENT DOCUMENTS

| | | | | |
|---|---|---|---|---|
| 2007/0055330 | A1* | 3/2007 | Rutherford | A61B 90/98 607/114 |
| 2008/0083721 | A1 | 4/2008 | Kaiserman | H05B 3/342 219/211 |
| 2013/0303351 | A1* | 11/2013 | Fu | B29C 44/445 493/54 |
| 2013/0318908 | A1* | 12/2013 | Holley | E04C 2/296 428/313.9 |
| 2015/0274928 | A1* | 10/2015 | Mehta | C08K 3/346 524/322 |
| 2016/0223269 | A1* | 8/2016 | Hartmann | A61F 7/02 |
| 2016/0374411 | A1* | 12/2016 | Brooks | A61F 7/007 165/104.21 |
| 2017/0347730 | A1* | 12/2017 | Baychar | A41D 31/125 |
| 2021/0101371 | A1* | 4/2021 | Ross | B32B 25/02 |
| 2022/0234895 | A1* | 7/2022 | Hashim | A23B 4/06 |
| 2022/0266494 | A1* | 8/2022 | Osawa | B32B 27/08 |

\* cited by examiner

MICROWAVE HEATABLE COMPOSITIONS AND ARTICLES MADE THEREFROM

BACKGROUND

The present invention relates generally to microwaveable compositions that generate heat upon exposure to microwave radiation and can be configured to release the generated heat for therapeutic purposes. The microwaveable compositions are incorporated into different types of therapeutic articles or inserts for therapeutic articles that can be clothing articles, including footwear, or auxiliary articles that can be used to heat different areas or parts of a subject's body.

It is well known that for therapeutic effect, muscle tissue should be heated in some circumstances. Heating pads are commonly used by people to alleviate back pain and other similar pains that may result from pulled muscles, arthritis or other ailments. There are a number of different forms of heating pads that are readily available, including electric heating pads and hot water bottles. Heat packs of various types have long been used in the medical field and by sportsmen for the purpose of applying heat to localized areas of the body to alleviate stiffness or minimize tissue damage due to freezing, for example.

A variety of devices are available for applying heat to localized areas of pain in the human body. Such devices include hot water bottles, which are ordinarily made of flexible rubber, and which can also include insulating coverings for conserving heat when the hot water bottle is filled with hot water. U.S. Pat. No. 2,072,564, to May, is an example of a conventional hot water bottle having a cover.

Other heating devices include electric heating pads in which a plurality of resistive heating elements are electrically actuated to provide a source of heat for treating localized areas of pain.

Hot water bottles suffer from a variety of disadvantages. They are cumbersome to use, since it is necessary to fill the interior of the bottles with hot water for each use. Even with an insulating covering, hot water bottles lack the ability to retain a significant amount of heat for a prolonged period of time.

Electric heating pads, while being more efficient than hot water bottles in operation and heat transfer ability, suffer from various limitations, such as the encumbrance which results from being attached to a power source by electrical wires. In addition, electric pads can constitute a hazard from electrical voltage if used around water, such as in bath areas.

In recent years, microwaveable heating pads containing sealed quantities of gel-type material, specially-designed beads and different seeds have become popular. As compared to electric heating pads, microwaveable heating pads do not require the user to stay near an electrical outlet. The non-electrical pads also avoid the necessity of continually subjecting a user to low-level EMF exposure from the internal wiring used in an electric heating pad. As compared to hot water bottles, microwaveable heating pads are more convenient since they do not require the user to frequently fill, drain and then refill the bag with water.

While the gel-filled, bead-filled and seed-filled microwaveable heating pads provide the above-noted advantages over the prior art, each of these types of heating pads suffer certain disadvantages. A gel-filled heating pad is subject to leakage and can be overheated with detrimental results. In addition, if leakage should occur, the gel material may stain adjacent upholstery or clothing. Bead-filled and seed-filled heating pads have the disadvantage of being relatively bulky. Attempts to compress bead-filled and seed-filled heating pads to eliminate free-space volume between the beads/seeds results in stiff heating pads that are uncomfortable to use.

The use of heating pads that are filled with clay particles are also know, but which suffer from the same disadvantages of gel-filled and seed-filed heating pads.

The present invention provides microwaveable compositions that overcome the disadvantages of prior art heating pads, and can be incorporated into different types of therapeutic articles or used as inserts for therapeutic articles that can be clothing articles, including footwear, or auxiliary articles that can be used to heat different areas of a subject's body.

BRIEF SUMMARY

According to various features, characteristics and embodiments of the present invention which will become apparent as the description thereof proceeds, the present invention provides a microwave heatable composite material that comprises: a heat resistant moldable base material; a microwave heatable material dispersed in the heat resistant moldable base material; and a phase change material dispersed in the heat resistant moldable base material.

In further, or alternative, embodiments weight-reducing materials can be incorporated into the microwave heatable composite material.

Microwave heatable articles are formed by molding the microwave heatable composite materials into a basic or core article layer that can further be provided with one or more layers that form multi-layer microwave heatable articles that are configured to control and/or inhibit or block heat transfer from the basic or core article layer.

The microwave heatable articles can be laminated with fabrics, polymeric materials or sponges.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

Figure 1:
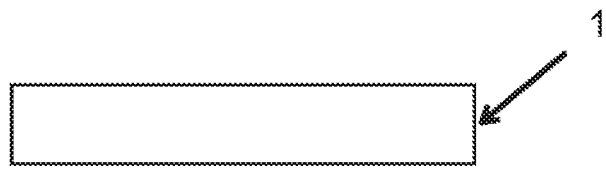
FIG. 1 is a cross-sectional view of a basic microwave heatable article according to one embodiment of the present invention.

The microwave heatable compositions (also referred to herein as "microwaveable compositions") comprise a heat resistant moldable base material and a microwave heatable material incorporated into the heat resistant moldable base material. In further embodiments the microwave heatable compositions can include auxiliary materials that can absorb and release heat, including those that change characteristics, phases or properties at different temperatures. In further embodiments weight reducing materials such as hollow beads or spheres can be incorporated into the microwave heatable compositions, as desired, to reduce overall weight. Hollow beads such as hollow plastic microspheres or microbeads can be used to reduce overall weight and provide thermal insulating properties.

The heat resistant moldable base material is a polymeric material that can withstand temperatures of at least up to about 60° C. and preferably at least up to 80° C. or higher, so that the microwave heatable material can be used in articles that can be machined washed in conventional washing machines and, if desired, dried in conventional clothes dryers. The heat resistant moldable base material should also be sufficiently flexible to be comfortably placed in contact with a subject's body part to be heated (or cooled), and/or wrapped against a subject's body part if desired. In some embodiments the flexibility of the heat resistant moldable base material should be similar to that of cloth or fabric so that the microwave heatable compositions can be formed into articles (e.g., sheets) that can be incorporated to clothing or wearable articles.

Suitable heat resistant moldable base materials including silicone rubbers. In general silicone rubbers are non-reactive, stable, and resistant to extreme environments and temperatures from 55° C. to 300° C. while still maintaining useful properties. Silicone rubbers of the present invention are produced from silicone rubbers that can be provided uncured in a gel or liquid state and cured, vulcanized, or catalyzed to form the heat resistant moldable base material of the present invention into various articles. Non-limiting examples of silicone that can be used include Elastose® RT 624A and Elastosil® RT 624B (From Wacker Chemie AG) and Dowsil™1-4105 (From Dow Corning).

A two component or two-part silicone rubber composition is particularly useful for purposes of the present invention. Such a two-part silicone rubber includes a platinum catalyzed silicone rubber and catalyst that are mixed together. Part A contains vinyl functional polymer and the platinum catalyst. Part B component contains the hydride crosslinker and inhibitor. In the presence of platinum the hydride and vinyl functionalities will react to form a cured silicone elastomer. In further embodiments of the present invention silicone foam rubber, also called silicone sponge rubber, can be used. Otherwise, one-part silicone rubber compositions can be used which do not require a separate curing agent.

The microwave heatable material incorporated into the heat resistant moldable base material includes those that are microwave heatable or, in other words, "microwave reactive." As used here, "microwave reactive" refers to a substance that will heat up or, in other words, increase in temperature when exposed to microwave radiation. Heating can be conveniently achieved in a microwave oven that produces microwave radiation in the S band having a frequency range of about 2 GHz to about 4 GHz and a wavelength range of about 7.5 cm to about 15 cm. For example, the microwave oven could be a household microwave oven, emitting microwave radiation with a frequency of about 2.45 GHz and a wavelength of about 12.2 cm The microwave heatable material is incorporated into the heat resistant moldable base material in the form of a powder. The powder should be sufficiently fine so as to be distributed evening into the heat resistant moldable base material. In addition to functioning as a heat generating component, the microwave heatable material can function in a manner similar to a filler that improves the mechanical properties of polymers.

Suitable microwave heatable materials include microwave reactive clays. such as bentonite, montmorillonite, kollinite, nacrite. bentonite, dickite, holloysite, illite and combinations thereof.

The microwave heatable material of the present invention allows microwave heatable articles of the present invention to be heated to a desired temperature in a conventional, household microwave oven.

In addition to microwave heatable clays, microwave invisible clays can also be used if desired. "Microwave invisible clays" are clays that do not heat up or increase in temperature when exposed to microwave radiation.

As noted above auxiliary materials can be included in the microwave heatable compositions which can absorb and release heat, including those that change characteristics, phases or properties at different temperatures. Exemplary auxiliary materials include phase change materials and particularly phase change materials that can be incorporated into the heat resistant moldable base material as powders or other particle shapes.

Phase change materials are substances that have high heats of fusion which melt and solidify at certain temperatures so that they are capable of storing and releasing significant amounts of energy. Heat is absorbed or released when the material changes from solid to liquid and vice versa. This ability to absorb or release heat allows the phase change materials to be used in embodiments of the present invention to apply therapeutic heat or cooling to a body part depending on whether the microwaveable compositions of the present invention are heated by microwaves of cooled in a freezer or other cold environment.

Phase change materials that are suitable for use in the present invention include Nextek™ 58D and Nextek57D (From Microtek Laboratories, Inc.).

As can be understood when both microwave heatable materials and phase change materials are incorporated into the heat resistant moldable base material and the resulting composition is exposed to microwave energy, the microwave heatable material generates heat and the phase change material can store and release the heat energy, thereby enhancing the amount of heat that can be stored and increasing the amount of time heat can be released.

Exemplary phase change materials include organic phase change materials such as paraffin having 21-34 carbon atoms and others listed at https://en.wikipedia.org/wiki/Phase-change_material, that do not adversely affect the desired functionality of the basic microwave heatable compositions that based on the combination of the heat resistant moldable base material and the microwave heatable material.

The amount of microwave heatable material(s) that can be incorporated into the heat resistant moldable base material ranges from about 10 wt. % to about 65 wt. %. When phase change materials are included they can be included in an amount of from about 7 wt. % to about 26 wt. %.

According to the present invention microwave heatable articles are produced by incorporating the microwave heatable material(s) into the heat resistant moldable base material alone or together with the phase change material(s) and then curing, vulcanized, and/or catalyzing the heat resistant moldable base material.

In the case of using a curable heat resistant moldable base material such as a two component platinum catalyzed silicone rubber, heat can be applied to accelerate the curing process if desired.

Microwave heatable articles can be molded in any suitable shape using molds that are preferably, but not necessarily, heated. For example, sheet shaped articles can be molded which can be incorporate into heating pads of various sizes and/or various articles of clothing or wearable articles. or cut into various shapes. In other embodiments microwave heatable articles can be molded in the shape of a foot, toe, hand and other body part shapes and designed and configured to be incorporated or removably inserted into shoes, slippers, socks, gloves, hats, scarfs, underwear, vests, trousers, shirts, slippers, leg-warmer and other articles of clothing and many other articles such as linings, blankets, and pillows to name a few.

Because the microwave heatable composition of the present invention can be molded in to flexible microwave heatable articles of any suitable size they are usable for known therapeutic purposes as convenient alternatives to prior art heating pads. In addition, flexible microwave heatable articles can be molded of convenient sizes to provide comfort to cold feet, hands and other body parts as well as provide heat such and other body areas (e.g., heads and necks) to prevent getting cold, for example when venturing outside in cold weather.

The microwave heatable articles of the present invention can be laminated with various fabrics for aesthetic purposes, for insulation purposes to control or slow down heat transfer outward and/or for purposes of being able to provide a cover that provides a comfortable feel for therapeutic use. In addition to fabrics, polymeric materials and/or sponge materials can be used. In some embodiments the fabrics, polymeric materials and/or sponge materials can be laminated directly to the heat resistant moldable base material and in other embodiments the fabrics, polymeric materials and/or sponge materials can be comprise covers into which the microwave heatable articles can be inserted and removed as desired.

It is to be understood that laminated microwave heatable articles of the present invention are preferably laminated with materials that will allow for repeated microwave heating as well as washing and drying, and preferably washing and drying in conventional clothing washing and drying machines.

Non-limiting embodiments of the present invention will be described in reference to FIGS. 1-4.

FIG. 1 is a cross-sectional illustration of a basic microwave heatable article according to one embodiment of the present invention. The basic or core microwave heatable article identified by reference numeral 1 comprises a layer that is molded from a mixture of a heat resistant molded base material as described above (e.g., silicone rubber), a microwave heatable material as described above (e.g., microwave heatable clay) and a phase change material.

The basic or core microwave heatable article is formed by mixing the microwave heatable material and phase change material into the heat resistant molded base material and curing the resulting mixture. The resulting mixture can be molded in a heated mold to provide a desired shape to the resulting article, or otherwise the resulting mixture can be molded in the form of a sheet or web from which basic or core microwave heatable articles of any desired shape can be cut.

Figure 2:
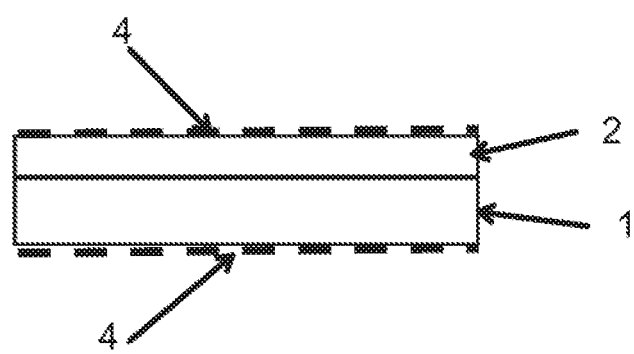
FIG. 2 is a cross-sectional view of a multi-layered microwave heatable article according to one embodiment of the present invention.

FIG. 2 is a cross-sectional illustration of a multi-layered microwave heatable article according to one embodiment of the present invention. In the embodiment of the invention shown in FIG. 2, layer 1 comprises the basic microwave heatable article of FIG. 1 and is provided with a layer 2 that controls the release of heat from the basic microwave heatable article. Layer 2 is molded from a mixture of a heat resistant molded base material as described above (e.g., silicone rubber) and a phase change material. In use, the multi-layered article of FIG. 2 is subjected to microwave radiation which causes the microwave heatable material in layer 1 to generate heat. As the heat is released from layer 1 through layer 2, the phase change material in layer 2 controls the heat released by adsorbing and then releasing at least a portion of the heat.

FIG. 2 (and FIGS. 3 and 4) depict fabric layers 4 that can be applied on either or both surfaces of the microwave heatable articles. The fabric layers provide a comfortable feel when the microwave heatable articles are handled and position against a user's body part. Suitable fabrics include those that provide a soft touch sensation. In some embodiments stretchable fabrics that provide more flexibility are more suitable for applications in which the microwave heatable articles are wrapped around a user's body part in an area that bends or flexes. The fabric layers 4 can be attached to the microwave heatable articles using adhesive materials. In other embodiments the fabric layers 4 can be position against the respective layers shown in FIGS. 2-4 before the layers are cured so as to be attached without an additional adhesive layer, with the fabric layers being in contact with and/or being penetrated partially by the uncured heat resistant base material before curing.

Figure 3:
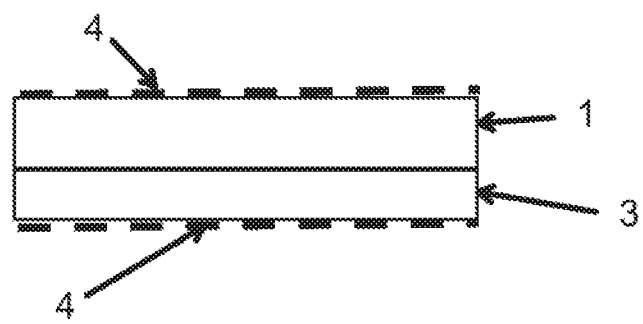
FIG. 3 is a cross-sectional view of a multi-layered microwave heatable article according to another embodiment of the present invention

FIG. 3 is a cross-sectional illustration of a multi-layered microwave heatable article according to another embodiment of the present invention. In the embodiment of the invention shown in FIG. 3, layer 1 comprises the basic microwave heatable article of FIG. 1 and is provided with a layer 3 that blocks heat from transferring from layer 1 through layer 3. Layer 3 is molded from a mixture of a heat resistant molded base material as described above (e.g., silicone rubber) and a phase change material. In this embodiment a phase change material can be used which prevents or reduces heat transfer through layer 3.

In an alternative embodiment, layer 3 can be molded from a mixture of a heat resistant molded base material as described above (e.g., silicone rubber) and hollow microspheres or microbeads. Here it is noted that in general any of the layers in the microwave heatable articles of the present invention can include a relatively small amount of hollow microspheres or microbeads for purposes of reducing weight. Such proportions can be readily determined by those skilled in the art by confirming that the amount of hollow microspheres or microbeads used does not adversely affect heating and desired heat transfer. In the alternative of FIG. 3 an amount of hollow microspheres or microbeads can be included in layer 3 that produces a desired insulation property and reduces or blocks heat transfer through layer 3. The amount of hollow microspheres or microbeads needed to provide a desired insulation properly can be easily determined by those skilled in the art by confirming that the amount of hollow microspheres or microbeads used provides a desired level of thermal insulation. A non-limiting example of hollow microspheres include Expancel 920 DE 80 d30 (From AkzoNobel).

Figure 4:
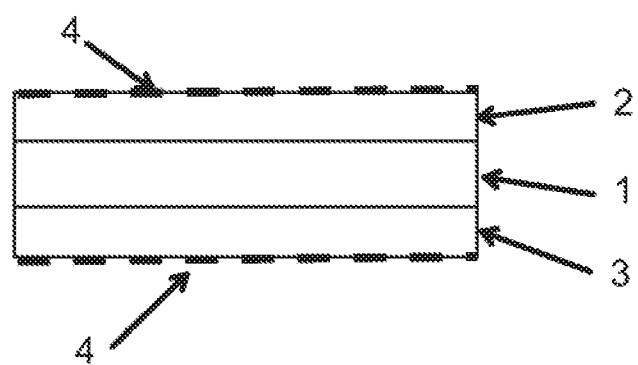
FIG. 4 is a cross-sectional view of a multi-layered microwave heatable article according to another embodiment of the present invention

FIG. 4 is a cross-sectional illustration of a multi-layered microwave heatable article according to another embodiment of the present invention. In the embodiment of the invention shown in FIG. 4, layer 1 comprises the basic microwave heatable article of FIG. 1, layer 2 is the layer from the embodiment of FIG. 2 that controls the release of heat from the basic microwave heatable article, and layer 3 is the layer from the embodiment of FIG. 3 that blocks or reduces heat transfer from the basic microwave heatable article.

Although reference has been made herein to microwave heatable articles and multi-layered microwave heatable articles, it is to be understood that the articles described and discussed herein can also be placed in freezers and cooled and used to provide cold therapy treatment. In this regard the moldable base material will stay cold for a time period and absorb heat. Further the phase change material component will change phase in one direction when releasing heat (when used for heat therapy) and in an opposite direction when absorbing heat (when used for cold therapy).

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. An article comprising:
   A core layer of a cured mixture of a silicone rubber base material, a phase change material, and a microwave heatable material that consists of clay;
   and at least one of
      a layer that controls heat release from the core layer comprising a fabric, polymeric material or sponge
      and
      a layer that blocks the release of heat from the core layer comprising silicone rubber, wherein at least one of the core layer, the layer that controls heat release, and the layer that blocks the release of heat comprises hollow microspheres or hollow microbeads.

2. The article according to claim 1, wherein the clay comprises bentonite.

3. The article according to claim 1, wherein the article is an article of clothing.

* * * * *